United States Patent [19]

Malloy, III

[11] Patent Number: 5,329,564
[45] Date of Patent: Jul. 12, 1994

[54] PASSIVE COOLING SYSTEM FOR A NUCLEAR REACTOR

[75] Inventor: John D. Malloy, III, Lynchburg, Va.

[73] Assignee: The Babcock & Wilcox Company, New Orleans, La.

[21] Appl. No.: 54,175

[22] Filed: Apr. 30, 1993

[51] Int. Cl.⁵ .............................................. G21C 15/18
[52] U.S. Cl. .................... 376/299; 376/282; 376/318
[58] Field of Search .............. 376/282, 299, 307, 318, 376/319; 60/203.1

[56] References Cited

U.S. PATENT DOCUMENTS

| | | | |
|---|---|---|---|
| 4,046,626 | 9/1977 | Winkler et al. | 376/299 |
| 4,986,956 | 1/1991 | Garabedian | 376/283 |
| 4,997,619 | 3/1991 | Pettus | 376/288 |

*Primary Examiner*—Daniel D. Wasil
*Attorney, Agent, or Firm*—Robert J. Edwards; D. Neil LaHaye

[57] ABSTRACT

A passive cooling system for removing decay heat from an open cycle nuclear reactor. Coolant tanks are filled with coolant during normal operation of the reactor and coolant pump. A check valve in the inlet line for each tank prevents loss of coolant through the inlet line. After the reactor is shut down and the coolant pump is inoperative, coolant flows from the coolant tanks through exhaust lines into the normal coolant line and to the reactor for removal of decay heat. A flow control valve or fixed orifice in the exhaust line for each tank provides for a different predetermined flow rate of coolant from each tank to match the decay heat rate of the reactor.

3 Claims, 1 Drawing Sheet

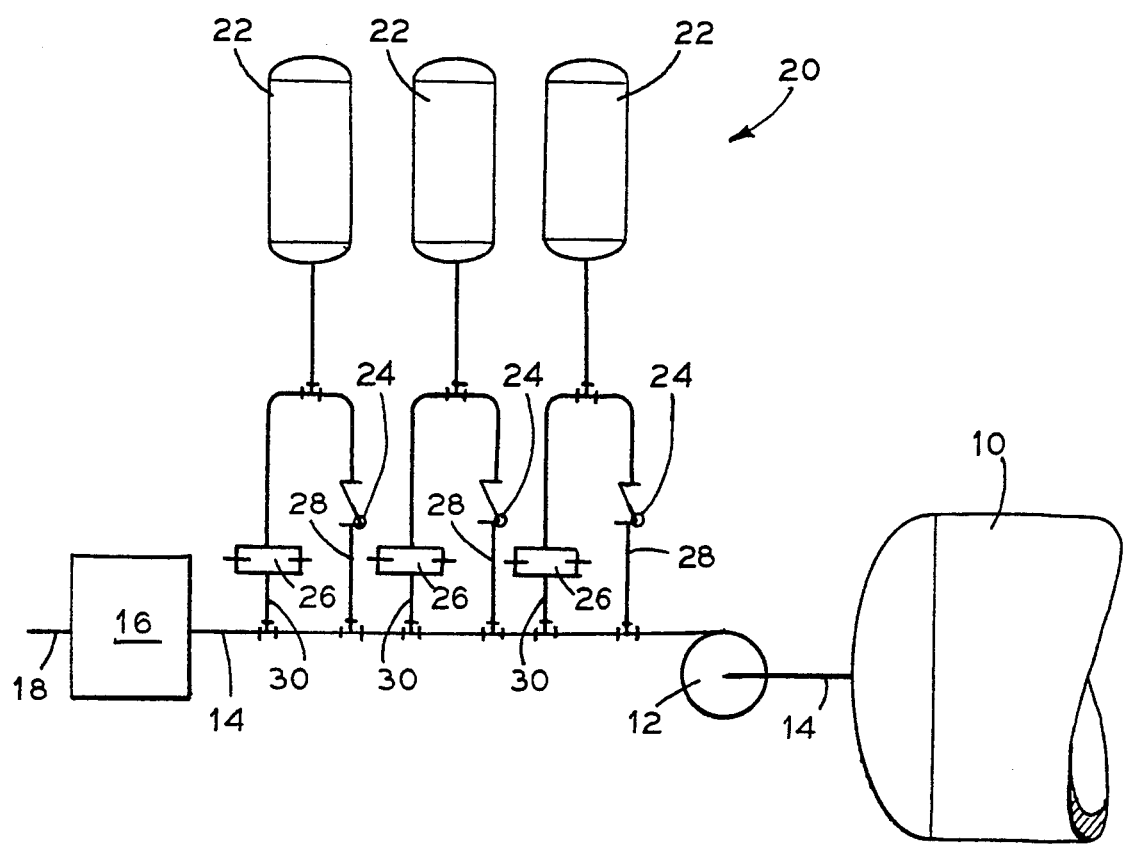

PASSIVE COOLING SYSTEM FOR A NUCLEAR REACTOR

BACKGROUND OF THE INVENTION

1. Field of the Invention

The present invention is generally related to open cycle reactors and more particularly to passive cooling of open cycle reactors.

2. General Background

Open cycle reactors intended for use in outer space have generally been focused on their use in nuclear rockets. Core fission power from delayed neutrons and gamma heating from fission products will continue to produce power after the reactor is shutdown. Information obtained from the NERVA program indicates that, because of this continued heating, the rocket engine turbopump would have to provide coolant to the reactor after reactor shutdown to prevent core melting. This turbopump was powered by coolant heated in the reactor core by decay heat. However, the turbopump could not operate efficiently at the low coolant flows and reactor powers produced by decay heat. This led to an operating scheme where the turbopump would be operated in a pulsed mode. In this mode, the engine is allowed to heat up to the designed operating temperature before providing a burst of coolant flow which would cool the reactor down to a lower temperature. The problem with this mode of operation is that it cycles much of the engine equipment and increases the potential for failure. One approach is to have the coolant pump continue to pump coolant to the reactor at a reduced rate. Pump failure or premature emptying of the coolant tank can result in reactor damage by melting. Over cooling of the reactor can also cause damage if the flow rate of the coolant pump is too high. This leaves a need for a means of removing decay heat from the reactor that does not require constant cycling of the engine equipment and is not dependent on the coolant pump.

SUMMARY OF THE INVENTION

The present invention addresses the above need in a straightforward manner. What is provided is a passive cooling system. Coolant tanks are connected to the normal coolant flow line between the coolant pump and the reactor. The coolant tanks are filled with pressurized coolant through check valves until they equal the pump discharge pressure. The pressure in the tanks remains constant while the coolant pump is operating. When the reactor and coolant pump are shut down, coolant escapes from the coolant tanks through lines in communication with the normal coolant line and flow to the reactor for removal of decay heat. Orifices of selected sizes control the coolant flow rate to match the decay heat rate of the reactor to provide the proper cooling required.

BRIEF DESCRIPTION OF THE DRAWINGS

For a further understanding of the nature and objects of the present invention reference should be had to the following description, taken in conjunction with the accompanying drawings in which like parts are given like reference numerals, and wherein:

The single FIGURE is a schematic illustration of the invention.

DETAILED DESCRIPTION OF THE PREFERRED EMBODIMENT

The drawing of FIG. 1 illustrates a typical open cycle nuclear reactor and coolant system. Coolant tank 10 contains pressurized coolant that is released to coolant pump 12 through coolant line 14. Coolant pump 12 directs coolant through coolant line 14 to nuclear reactor 16. In an open cycle reactor designed for use in outer space the coolant exits reactor 16 through exhaust line 18 and may be used for providing propulsive thrust and/or providing power in conjunction with dynamic conversion devices. When reactor 16 and coolant pump 12 are shut down, it is necessary to remove decay heat from reactor 16. This is accomplished by incorporating passive cooling system 20 into the nuclear reactor coolant system.

Passive cooling system 20 is generally comprised of coolant tanks 22, check valves 24, and flow control means 26.

Coolant tanks 22 are in fluid communication with coolant line 14 by means of inlet lines 28 and exhaust lines 30. Check valves 24 positioned in inlet lines 28 allow coolant to flow from coolant line 14 into coolant tanks 22 while preventing coolant flow from coolant tanks 22 into inlet lines 28. Flow control means 26 is positioned in exhaust lines 30 to provide a predetermined coolant flow rate from each coolant tank 22 into exhaust lines 30, coolant line 14, and to reactor 16. Each flow control means 26 provides for a different rate of coolant flow. The flow rate of each flow control means 26 is determined by the known decay heat rate of reactor 16. This allows the coolant flow rate from tanks 22 to match the decay heat rate of the reactor to prevent under or over cooling after reactor 16 is shutdown and coolant pump 12 is inoperative. Each flow control means 26 may be a control valve or a fixed orifice.

During normal operations of reactor 16, coolant from coolant tank 10 is received by coolant pump 12. Coolant pump 12 forces the coolant through coolant line 14 to reactor 16 and into inlet lines 28. Check valves 24 allow coolant to flow into coolant tanks 22 until the coolant pressure therein equals the discharge pressure of coolant pump 12. Check valves 24 also prevent the back flow of coolant through inlet lines 28 when the coolant pump discharge pressure decreases. When reactor 16 is shut down, coolant pump 12 is also shut down as a normal function of system operation. Coolant pressure in coolant line 14 then drops to a level below that in coolant tanks 22. At that time, flow control means 26 allow flow of coolant from coolant tanks 22 into coolant line 14. Due to the pressure from coolant tanks 22, the coolant travels to reactor 16, removes decay heat, and exits through exhaust line 18. Each flow control means 26 provides for a different rate of flow. The flow rate of each control means 26 is determined in relation to the known decay heat rate of reactor 16 and the volume and number of coolant tanks 22 to be used. In this manner, the initial coolant flow from all of coolant tanks 22 provides sufficient coolant for the higher level of decay heat immediately after reactor shutdown. As the pressure in coolant tanks 22 is reduced, or the tanks successively empty, the reduced coolant flow is sufficient for lower levels of heat removal required during the later stages of decay heat removal. Thus, the decay heat rate of the reactor is matched to prevent under or over cooling and to provide the proper rate of cooling. This provides a passive cooling system for removal of decay heat that is automatically filled with coolant during normal reactor operations and begins operation at reactor and coolant pump shutdown without the need for complicated controls that may easily malfunction.

Because many varying and differing embodiments may be made within the scope of the inventive concept herein taught and because many modifications may be made in the embodiment herein detailed in accordance with the descriptive requirement of the law, it is to be understood that the details herein are to be interpreted as illustrative and not in a limiting sense.

What is claimed as Invention:

1. In a nuclear reactor coolant system where a coolant pump receives coolant from a coolant tank and directs coolant through a coolant line to the reactor during normal reactor operation, a passive coolant system for removing decay heat from the reactor when the coolant pump is inoperative, said passive cooling system comprising:

a. a plurality of coolant tanks in fluid communication with the coolant line via an inlet line and an exhaust line for each tank;
   b. a check valve in each inlet line; and
   c. flow control means in each exhaust line.

2. The passive cooling system of claim 1, wherein each of said flow control means provides for a different predetermined flow rate.

3. The passive cooling system of claim 1, wherein the flow rate of said flow control means is directly related to the decay heat rate of the nuclear reactor.

* * * * *